(12) United States Patent
Kitagawa

(10) Patent No.: US 11,842,518 B2
(45) Date of Patent: Dec. 12, 2023

(54) CAMERA APPARATUS, CONTROL METHOD FOR CAMERA APPARATUS, AND STORAGE MEDIUM

(71) Applicant: CANON KABUSHIKI KAISHA, Tokyo (JP)

(72) Inventor: Eiichiro Kitagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/723,278

(22) Filed: Apr. 18, 2022

(65) Prior Publication Data

US 2022/0343540 A1   Oct. 27, 2022

(30) Foreign Application Priority Data

Apr. 22, 2021 (JP) ................................. 2021-072556

(51) Int. Cl.
*G06T 7/80* (2017.01)
*G06T 7/00* (2017.01)
*H04N 23/63* (2023.01)
*H04N 23/661* (2023.01)

(52) U.S. Cl.
CPC ................. *G06T 7/80* (2017.01); *G06T 7/97* (2017.01); *H04N 23/633* (2023.01); *H04N 23/661* (2023.01)

(58) Field of Classification Search
CPC ........... G06T 7/80; G06T 7/97; H04N 23/633; H04N 23/661; H04N 7/181
See application file for complete search history.

(56) References Cited

U.S. PATENT DOCUMENTS

| | | | |
|---|---|---|---|
| 10,713,916 B1* | 7/2020 | Cole Thomas | H04N 7/183 |
| 11,581,099 B1* | 2/2023 | Rufo | G05B 15/02 |
| 2018/0343231 A1* | 11/2018 | Terajima | H04L 61/5076 |

FOREIGN PATENT DOCUMENTS

JP    2015204102 A    11/2015

* cited by examiner

*Primary Examiner* — Yogesh K Aggarwal
(74) *Attorney, Agent, or Firm* — Canon U.S.A., Inc. IP Division

(57) ABSTRACT

A camera apparatus includes a search unit configured to search for another camera apparatus connected to the camera apparatus via a network, and a display unit configured to display, on a terminal device, information related to a device connected to the another camera apparatus found by the search and an instruction area for issuing an instruction to display a video image that is generated by superimposing, on a video image captured by the another camera apparatus, the information related to the device connected to the another camera apparatus.

13 Claims, 9 Drawing Sheets

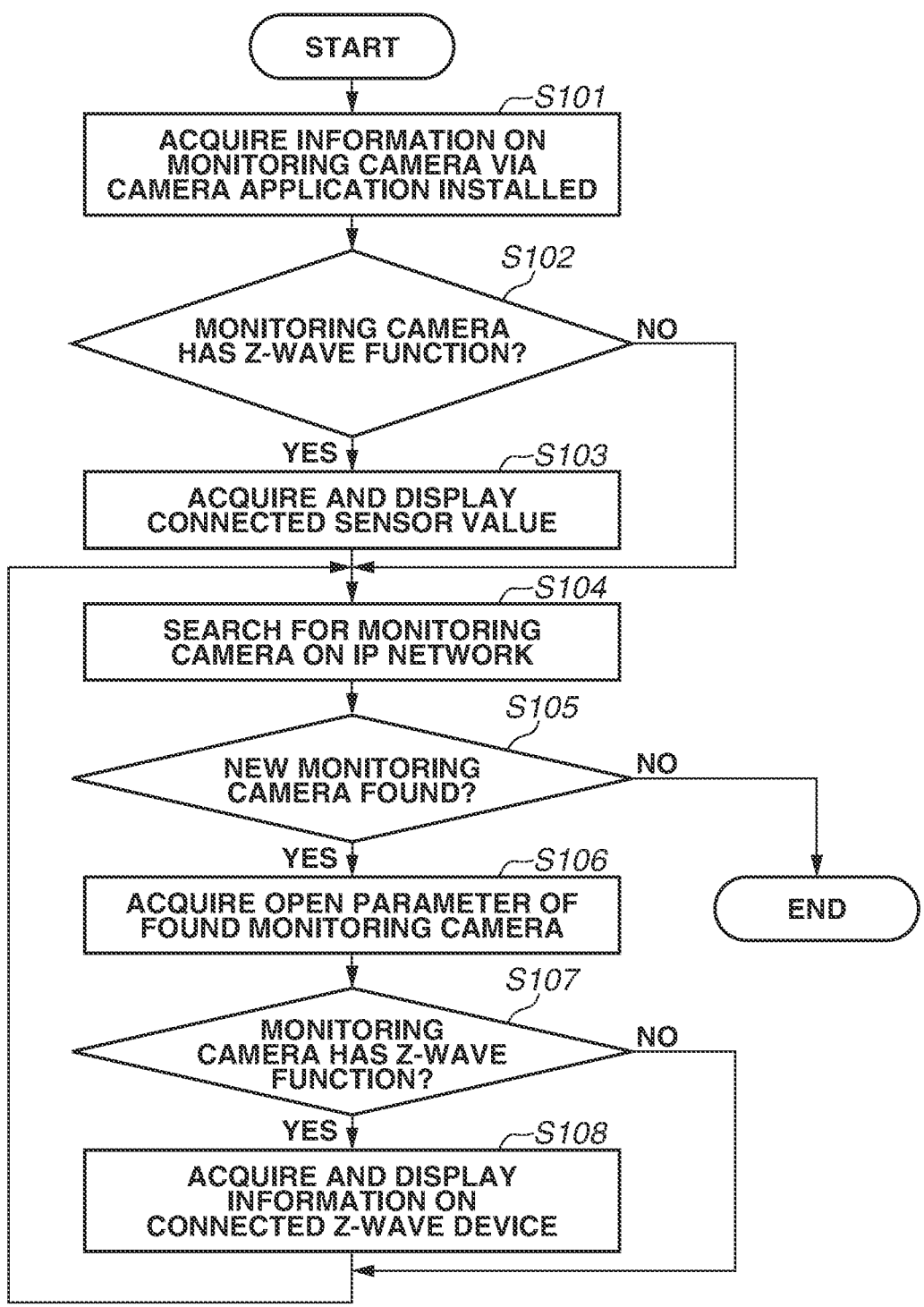

Root.Properties.Zwave.enabled=true
Root.Properties.Zwave.homeId=1
Root.Properties.Zwave.deviceNum=2
Root.Properties.Zwave.OsdURL="/sensorview"
Root.Properties.Zwave.dev1.devId=2
Root.Properties.Zwave.dev1.name="TEMPERATURE/HUMIDITY SENSOR"
Root.Properties.Zwave.dev1.class="MultiLevelSensor"
Root.Properties.Zwave.dev1.num=2
Root.Properties.Zwave.dev1.sd1.sensortype="Air temperature"
Root.Properties.Zwave.dev1.sd2.sensortype="Humidity"
Root.Properties.Zwave.dev2.devId=3
Root.Properties.Zwave.dev2.name="ILLUMINANCE SENSOR"
Root.Properties.Zwave.dev2.class="MultiLevelSensor"
Root.Properties.Zwave.dev2.num=1
Root.Properties.Zwave.dev2.sensortype="Illuminace"

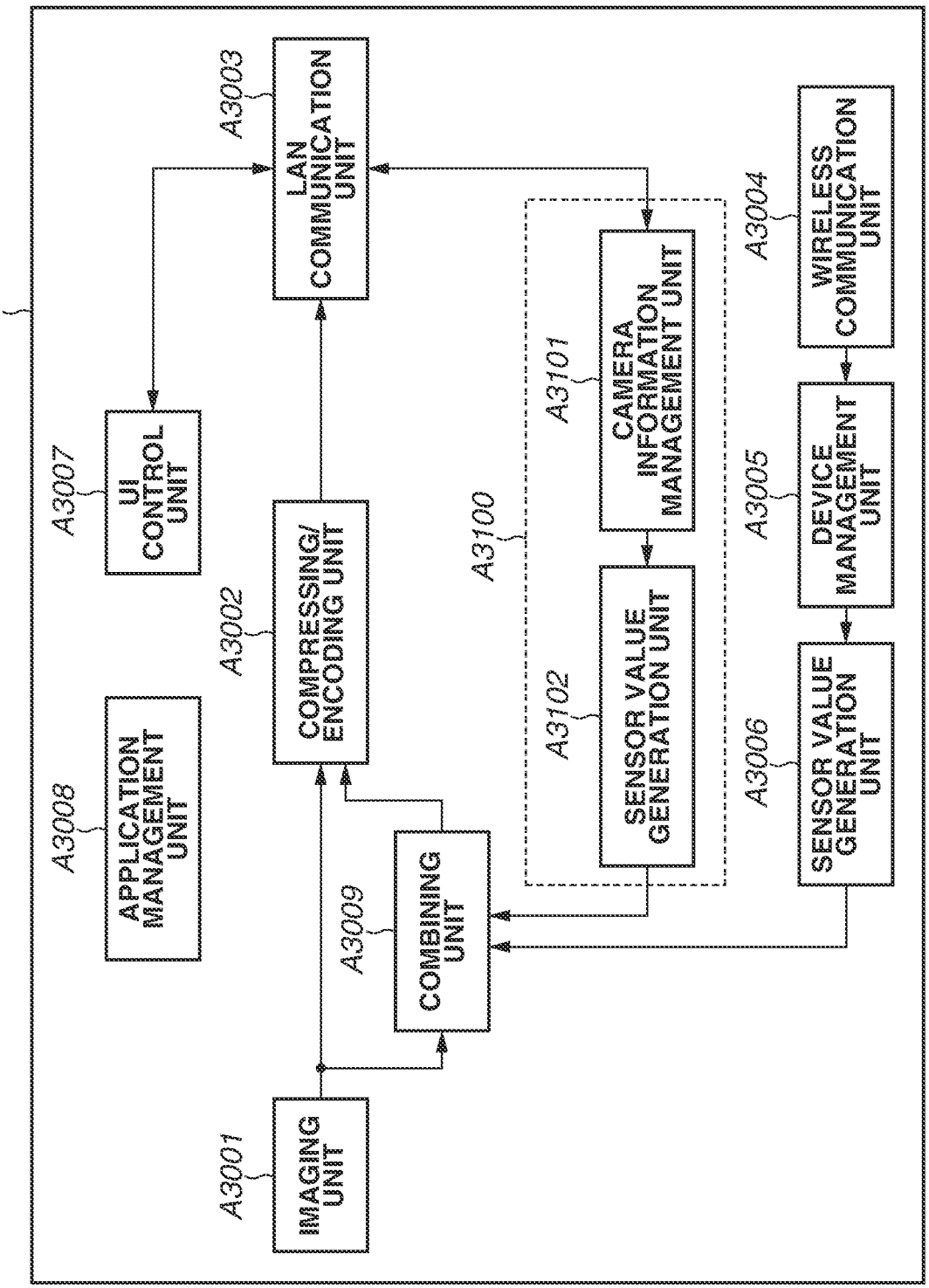

CAMERA APPARATUS, CONTROL METHOD FOR CAMERA APPARATUS, AND STORAGE MEDIUM

BACKGROUND OF THE DISCLOSURE

Field of the Disclosure

The present disclosure relates to a camera apparatus, a control method for a camera apparatus, and a storage medium.

Description of the Related Art

Z-Wave is a mesh networking type wireless communication protocol, and there is known a type of monitoring camera in which a Z-Wave function is installed to control operations of Z-Wave devices to acquire states and values of the Z-Wave devices. Among such monitoring cameras, a monitoring camera compliant with the sensor multi-value class of Z-Wave can further acquire analog values, such as a current temperature and illuminance, from a temperature sensor and an illuminance sensor provided with the Z-Wave function.

Examples of displaying methods of the acquired values include a method of displaying the acquired values on a dedicated web page of a camera, a method of releasing parameters by using the protocol, and a method of superimposing the acquired values on a video image as an on-screen display (OSD). In the method of releasing the camera parameters by using the protocol, a user needs to install a dedicated application supporting the protocol into a terminal device, which takes time and labor. In the display method of displaying the values of the sensors on the dedicated web page, there arises a difficulty in continuously recording the values of the sensors. In the method of superimposing the values of the sensors on a video image as an OSD, it is easy to understand which value corresponds to which position on the video image because the video image and the values of sensors can be displayed on one screen. Further, in this method, the superimposed sensor values can also be stored by storing the video image of the monitoring camera.

As a method for monitoring a video image of a monitoring camera, there is a method of displaying a video image on a web page provided by a monitoring camera via a connection from a browser of a terminal device to the monitoring camera. Further, there is another method of installing a dedicated application for monitoring video images of a plurality of monitoring cameras, called Video Management System (VMS).

Japanese Patent Application Laid-Open No. 2015-204102 discusses a monitoring system. The monitoring system includes a camera and a sensor associated with the camera, a base telephone capable of communicating with the camera and connected to a fixed telephone network, and a mobile terminal device capable of wirelessly communicating with the base telephone. The monitoring system displays association between the camera and the sensor and changes the association in response to an operation performed on the mobile terminal device.

However, in a case where many cameras are installed on a floor or in a building, there is an issue that a user has difficulty in finding a camera from among the cameras to obtain a desired video image on which a sensor value has been superimposed. In the technique discussed in Japanese Patent Application Laid-Open No. 2015-204102, while association between a camera and a sensor can be displayed, the camera and the sensor are connected to a fixed telephone serving as a base telephone in accordance with a communication protocol for cordless telephones, and the association between the camera and the sensor is managed by the base telephone in a centralized manner. Consequently, only dedicated sensor devices supporting the communication protocol for cordless telephones can connect to the camera. In addition, in the method of using VMS, a server apparatus that has the VMS installed needs to be managed to operate 24 hours through 365 days. Alternatively, an expensive VMS dedicated apparatus needs to be purchased.

SUMMARY OF THE DISCLOSURE

According to an aspect of the present disclosure, a camera apparatus includes a search unit configured to search for another camera apparatus connected to the camera apparatus via a network, and a display unit configured to display, on a terminal device, information related to a device connected to the another camera apparatus found by the search and an instruction area for issuing an instruction to display a video image that is generated by superimposing, on a video image captured by the another camera apparatus, the information related to the device connected to the another camera apparatus.

Further features of the present disclosure will become apparent from the following description of exemplary embodiments with reference to the attached drawings.

BRIEF DESCRIPTION OF THE DRAWINGS

FIG. 4 is a flowchart illustrating processing by the application.

FIG. 5 is a diagram illustrating parameters released by a Z-Wave compliant camera.

FIG. 8 is a block diagram illustrating a configuration example of a camera apparatus.

DESCRIPTION OF THE EMBODIMENTS

Hereinbelow, exemplary embodiments will be described with reference to the attached drawings. Configurations illustrated in the attached drawings are merely examples and not intended to limit the configurations in the exemplary embodiments to the illustrated configurations.

Figure 1:
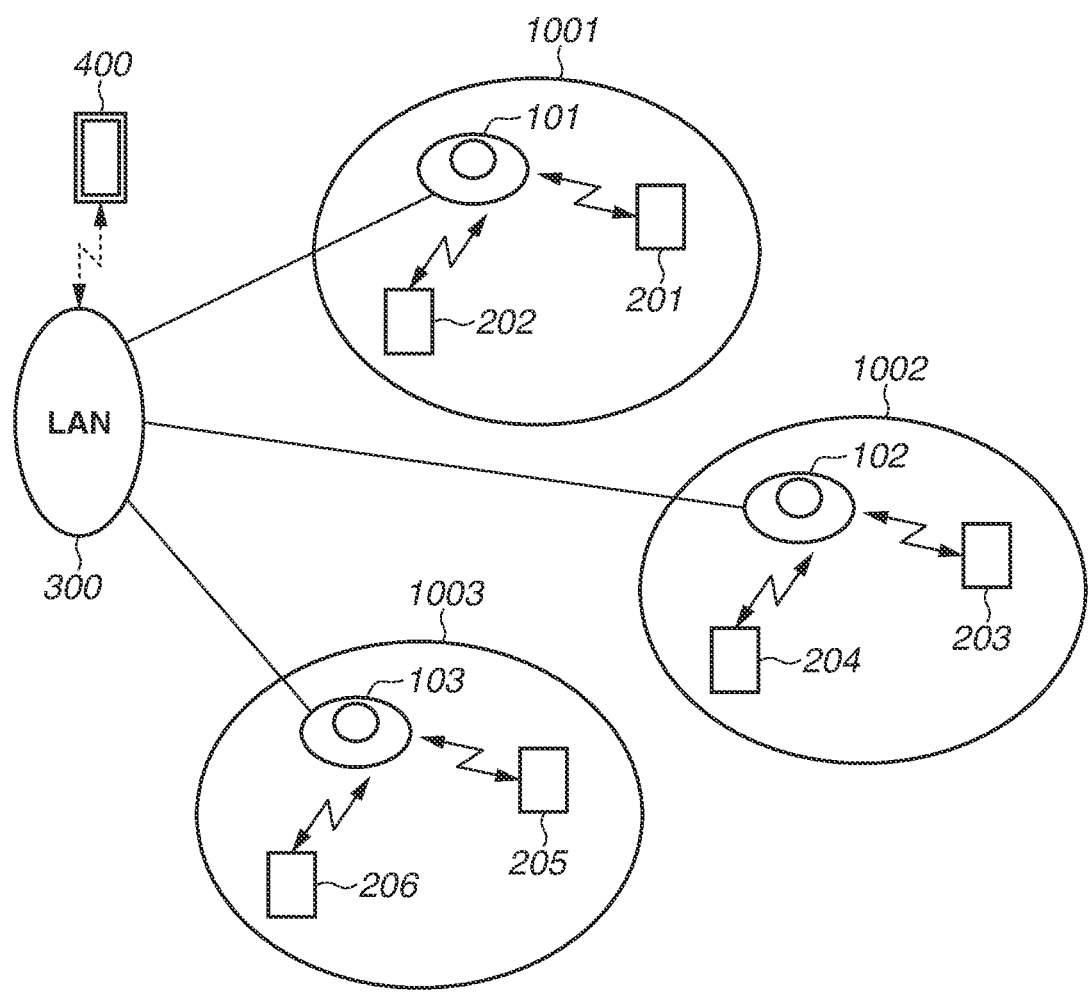
FIG. 1 is a diagram illustrating a configuration example of a monitoring system.

FIG. 1 is a diagram illustrating a configuration example of a monitoring system according to a first exemplary embodiment. The monitoring system includes an Internet Protocol (IP) network 300, a terminal device 400, and Z-Wave networks 1001 to 1003. Z-Wave is a wireless communication standard.

The Z-Wave network 1001 includes a monitoring camera 101, a temperature/humidity sensor 201 (hereinbelow, also referred to as a sensor 201), and an illuminance sensor 202 (hereinbelow, also referred to as a sensor 202). The temperature/humidity sensor 201 and the illuminance sensor 202 are Z-Wave devices wirelessly connected to the monitoring camera 101 via a Z-Wave communication.

The Z-Wave network 1002 includes a monitoring camera 102, a temperature/humidity sensor 203 (hereinbelow, also referred to as a sensor 203), and an illuminance sensor 204 (hereinbelow, also referred to as a sensor 204). The temperature/humidity sensor 203 and the illuminance sensor 204 are Z-Wave devices wirelessly connected to the monitoring camera 102 via a Z-Wave communication.

The Z-Wave network 1003 includes a monitoring camera 103, a door open/close sensor 205 (hereinbelow, also referred to as a sensor 205), and a motion sensor 206, The door open close, sensor 205 and the motion sensor 206 are Z-Wave devices wirelessly connected to the monitoring camera 103 via a Z-Wave communication.

The Z-Wave networks 1001 to 1003 are Z-Wave networks including the monitoring cameras 101 to 103, respectively. The monitoring cameras 101 to 103 are monitoring camera apparatuses each including a host function of Z-Wave that is a mesh networking type wireless communication protocol. The IP network 300 is an IP network including a wired local area network (LAN) and a wireless LAN. The terminal device 400 is a terminal device connected to the monitoring cameras 101 to 103 via the IP network 300.

A camera application for managing monitoring cameras and sensor information is installed in advance in the monitoring camera 101. The installed camera application is plugged in to a web server and can open a screen of the camera application by tracking back camera web pages of the monitoring cameras.

A user operates a web browser of the terminal device 400 to connect the terminal device 400 to the monitoring camera 101. The terminal device 400 displays a screen of Z-Wave device information generated by the camera application. In this process, the terminal device 400 displays sensor values of the sensors 201 and 202 connected to the monitoring camera 101, and information related to the sensors 203 and 204 connected to the monitoring camera 102 and information related to the sensors 205 and 206 connected to the monitoring camera 103. Further, the terminal device 400 displays link buttons each for jumping to an on-screen display (OSD) screen of corresponding one of the monitoring cameras 101 to 103.

Figure 2:
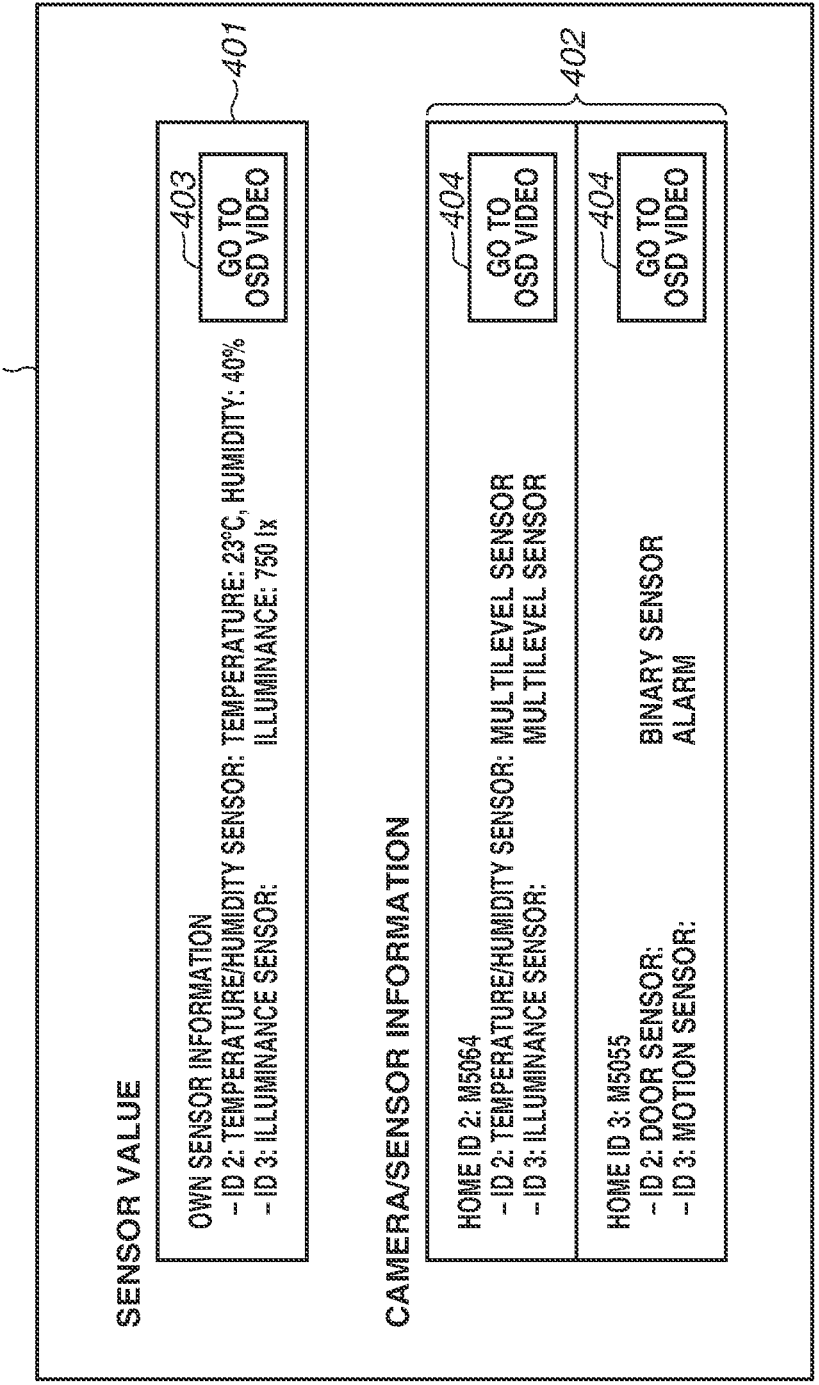
FIG. 2 is a diagram illustrating a display example of sensor information by an application.

FIG. 2 is a diagram illustrating an example of a sensor value 401 and camera/sensor information 402 that are displayed on the web browser of the terminal device 400 by the monitoring camera 101. The terminal device 400 displays, by the monitoring camera 101, names of the sensors 201 and 202 which are connected to the monitoring camera 101 by using the Z-Wave protocol, and values of temperature, humidity, and illuminance acquired from the sensors 201 and 202, as the sensor value 401. Further, on the right side in the sensor value 401, the terminal device 400 displays a link button 403 for causing the monitoring camera 101 to jump to a Uniform Resource Locator (URL) of the OSD screen of its own (the OSD screen of the monitoring camera 101).

The terminal device 400 displays, as the camera/sensor information 402, model names of the monitoring cameras 102 and 103 which have been detected, and Z-Wave network identifications (IDs) of the monitoring cameras 102 and 103. Further, the terminal device 400 displays, as the camera/sensor information 402, connected device names (sensor names) and Z-Wave class information indicating a class of the devices, for each of the monitoring cameras 102 and 103. Further, the terminal device 400 displays, on the right side in the camera/sensor information 402, link buttons 404 each for jumping to a URL of an OSD screen of corresponding one of the monitoring cameras 102 and 103.

Figure 3:
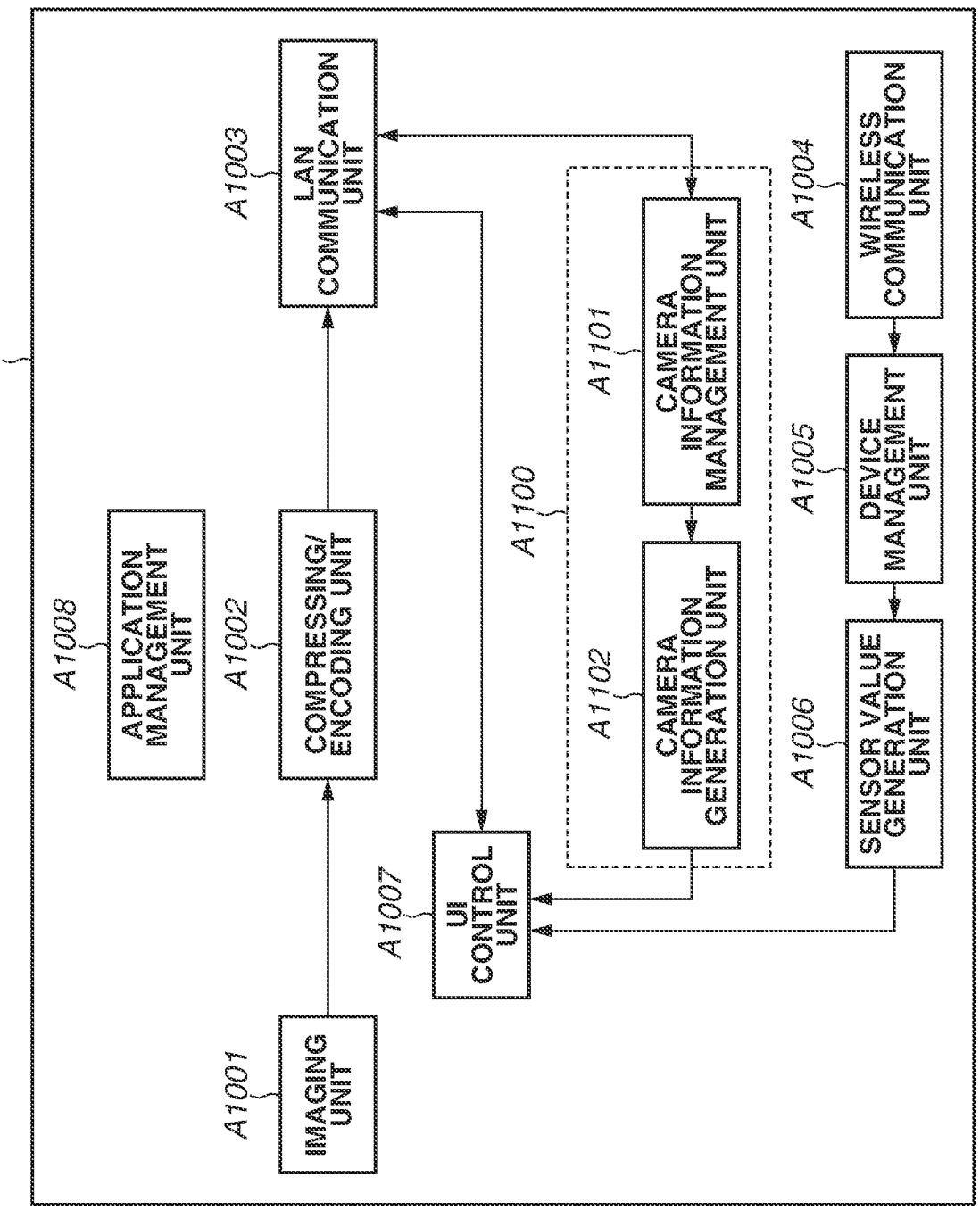
FIG. 3 is a block diagram illustrating a configuration example of a camera apparatus.

FIG. 3 is a block diagram illustrating an example of a functional configuration of the monitoring camera 101 according to the present exemplary embodiment. The monitoring camera 101 includes an imaging unit A1001, a compressing/encoding unit A1002, a LAN communication unit A1003, a wireless communication unit A1004, a device management unit A1005, a sensor value generation unit A1006, and a user interface (UI) control unit A1007. Further, the monitoring camera 101 includes an application management unit A1008 and an application unit A1100. The application unit A1100 is a camera application unit and includes a camera information management unit A1101 and a camera information generation unit A1102.

The imaging unit A1001 converts light, from an object and passed through a lens, incident on the image sensor into an electrical signal by using an image sensor, to generate a video image. The compressing/encoding unit A1002 compresses and encodes the video image generated by the imaging unit A1001 and generates image data. The LAN communication unit A1003 transmits the compressed and encoded image data to the IP network 300.

The wireless communication unit A1004 communicates with the sensors 201 and 202 by using the Z-Wave protocol. The device management unit A1005 manages information related to the sensors 201 and 202. The sensor value generation unit A1006 generates, based on the information related to the sensors 201 and 202, the sensor value 401 of the sensors 201 and 202 illustrated in FIG. 2, and displays the generated sensor value 401 on the terminal device 400 via the UI control unit A1007. The UT control unit A1007 is a control unit for a web user interface, and includes a web page and a program for display on the web server and the web browser. The UI control unit A1007 controls display on the terminal device 400 and input from the terminal device 400.

The application management unit A1008 controls the camera application installed in the monitoring camera 101. The application unit A1100 corresponds to the camera application installed and plugged in to the web server for monitoring cameras to operate. The application unit A1100 includes the camera information management unit A1101 and the camera information generation unit A1102. The camera information management unit A1101 sends a broadcast packet to the IP network 300 to search for the monitoring cameras 102 and 103. Then, the camera information management unit A1101 acquires information related to the sensors 203 and 204 connected to the monitoring camera 102 and information related to the sensors 205 and 206 connected to the monitoring camera 103, from the monitoring cameras 102 and 103 found by the search. The camera information generation unit A1102 generates the camera/sensor information 402 illustrated in FIG. 2, based on the acquired information of the sensors 203 to 206, and displays the generated camera/sensor information 102 on the terminal device 400 via the UI control unit A1007.

FIG. 4 is a flowchart illustrating a control method of the monitoring camera 101. In step S101, upon activation of the camera application, the application management unit A1008 acquires information (parameters) related to the monitoring camera 101 via the camera application installed.

In step S102, the application management unit A1008 determines, based on the acquired information, whether the monitoring camera 101 has a Z-Wave function. In a case where the application management unit A1008 determines that the monitoring camera 101 has a Z-Wave function (YES in step S102), the processing proceeds to step S103. On the other hand, in a case where the application management unit A1008 determines that the monitoring camera 101 does not have a Z-Wave function (NC) in step S102), the processing proceeds to step S104.

In step S103, the wireless communication unit A1004 accesses an application programing interface (API) in the monitoring camera 101, which is accessible by the camera application. The device management unit A1005 acquires, via the API, the sensor value 401 of the sensors 201 and 202 connected to the monitoring camera 101.

The sensor value generation unit A1006 displays, via the UI control unit A1007, the sensor value 401 of the sensors 201 and 202 on a screen of the web browser of the terminal device 400. Further, the sensor value generation unit A1006 displays, via the UI control unit A1007, the link button 403 for jumping to the URL of the OSD screen of the monitoring camera 101, on the screen of the web browser of the terminal device 400. Then, the processing proceeds to step S104.

In step S104, the camera information management unit A1101 sends a broadcast packet over the IP network 300 to search for the monitoring cameras 102 and 103.

In step S105, the camera information management unit A1101 determines whether a response is received from a new monitoring camera in response to the sent broadcast packet. In a case where the camera information management unit A1101 determines that a response is received from a new monitoring camera (YES in step S105), the processing proceeds to step S106. On the other hand, in a case where the camera information management unit A1101 determines that a response is not received from a new monitoring camera (NO in step S105), the processing in FIG. 4 ends.

In step S106, the camera information management unit A1101 registers, to a list, the IP address information of the monitoring camera 102 or 103 that has responded to the sent broadcast packet. Then, the camera information management unit A1101 acquires open parameters released over the IP network 300 by the monitoring camera 102 or 103 via the network API. In step S107, the camera information management unit A1101 determines whether the monitoring camera 102 or 103 has a Z-Wave function. In a case where the camera information management unit A1101 determines that the monitoring camera 102 or 103 has a Z-Wave function (YES in step S107), the processing proceeds to step S108. On the other hand, in a case where the camera information management unit A1101 determines that neither the monitoring camera 102 nor the monitoring camera 103 has a Z-Wave function (NO in step S107), the processing returns to step S104.

In step S108, the camera information management unit A1101 acquires, from the monitoring camera 102 or 103, the camera/sensor information 402 related to the sensors 203 and 204 connected to the monitoring camera 102 and the sensors 205 and 206 connected to the monitoring camera 103. The camera information generation unit A1102 displays, via the UI control unit A1007, the camera/sensor information 402 related to the sensors 203 and 204 connected to the monitoring camera 102 and the sensors 205 and 206 connected to the monitoring camera 103 on the screen of the web browser of the terminal device 400.

Further, the camera information generation unit A1102 displays, via the control unit A1007, the link buttons 404 each for jumping to the URL of the OSD screen of corresponding one of the monitoring cameras 102 and 103 on the screen of the web browser of the terminal device 400. Then, the processing returns to step S104.

The user can select the link button 403, to link to the monitoring camera 101, on the screen of the web browser of the terminal device 400. Then, the monitoring camera. 101 displays, on the screen of the web browser of the terminal device 400, an OSD image generated by superimposing the sensor information (sensor values) of the sensors 201 and 202 on a video image captured by the imaging unit A1001 of the monitoring camera 101.

The user can select one of the link buttons 404, to link to the monitoring camera 102, on the web browser screen of the terminal device 400. Then, the terminal device 400 is redirected to the URL of the monitoring camera 102. The monitoring camera 102 displays, on the screen of the web browser of the terminal device 400, an OSD image generated by superimposing the sensor information (sensor values) of the sensors 203 and 204 on a video image captured by the monitoring camera 102.

The user can select the other of the link buttons 404, to link to the monitoring camera 103, on the screen of the web browser of the terminal device 400. Then, the terminal device 400 is redirected to the URL of the monitoring camera 103. The monitoring camera 103 displays, on the screen of the web browser of the terminal device 400, an OSD image generated by superimposing the sensor information (sensor values) of the sensors 205 and 206 on a video image captured by the monitoring camera 103.

FIG. 5 is a diagram illustrating an example of an open parameter 500 released over the IP network 300 by the monitoring camera 102. First to fourth lines from the top of the open parameter 500 indicate information related to the monitoring camera 102 releasing the open parameter. The first to fourth lines from the top of the open parameter 500 are character strings indicating a Z-Wave function enabled/disabled state, a Z-Wave network ID, the number of Z-Wave devices (sensors 203 and 204) connected to the monitoring camera 102, and the URL of the OSD screen.

The lines at and below the fifth line in the open parameter 500 indicate information related to Z-Wave devices currently connected to the monitoring camera 102. The lines at and below the fifth line in the open parameter 500 indicate Z-Wave device IDs, Z-Wave device names, Z-Wave command class information indicating types of the Z-Wave devices, and the number of sensor values held by each of the Z-Wave devices.

In this example, the sensor 203 with the device ID 2 has two sensor values. The two sensor values are temperature and humidity. In a case where the Z-Wave function of the monitoring camera 102 is in a disabled state, the camera information management unit A1101 determines that the monitoring camera 102 does not have a Z-Wave function in step S107.

As described above, according to the present exemplary embodiment, the monitoring camera 101 displays, on the web browser of the terminal device 400, the sensor value 401 of its own (monitoring camera 101) and the camera/sensor information 402 of the others (monitoring cameras 102 and 103). Further, the monitoring camera 101 displays, on the web browser of the terminal device 400, the link buttons 403 and 404 each for linking to the OSD image generated by superimposing the sensor values on the video image of corresponding one of the monitoring cameras 101, 102 and 103, The user can check the video image and the sensor values by operating one of the link buttons 403 and 404 on the terminal device 400 to display a desired video image of any of the monitoring cameras 101 to 103, together with the corresponding sensor values.

In the first exemplary embodiment, as illustrated in FIG. 2, the monitoring camera 101 displays the list of the sensors 201 to 206 on the web browser of the terminal device 400. In a second exemplary embodiment, however, the monitoring camera 101 superimposes information on the video image and displays the resultant image.

Figure 6:
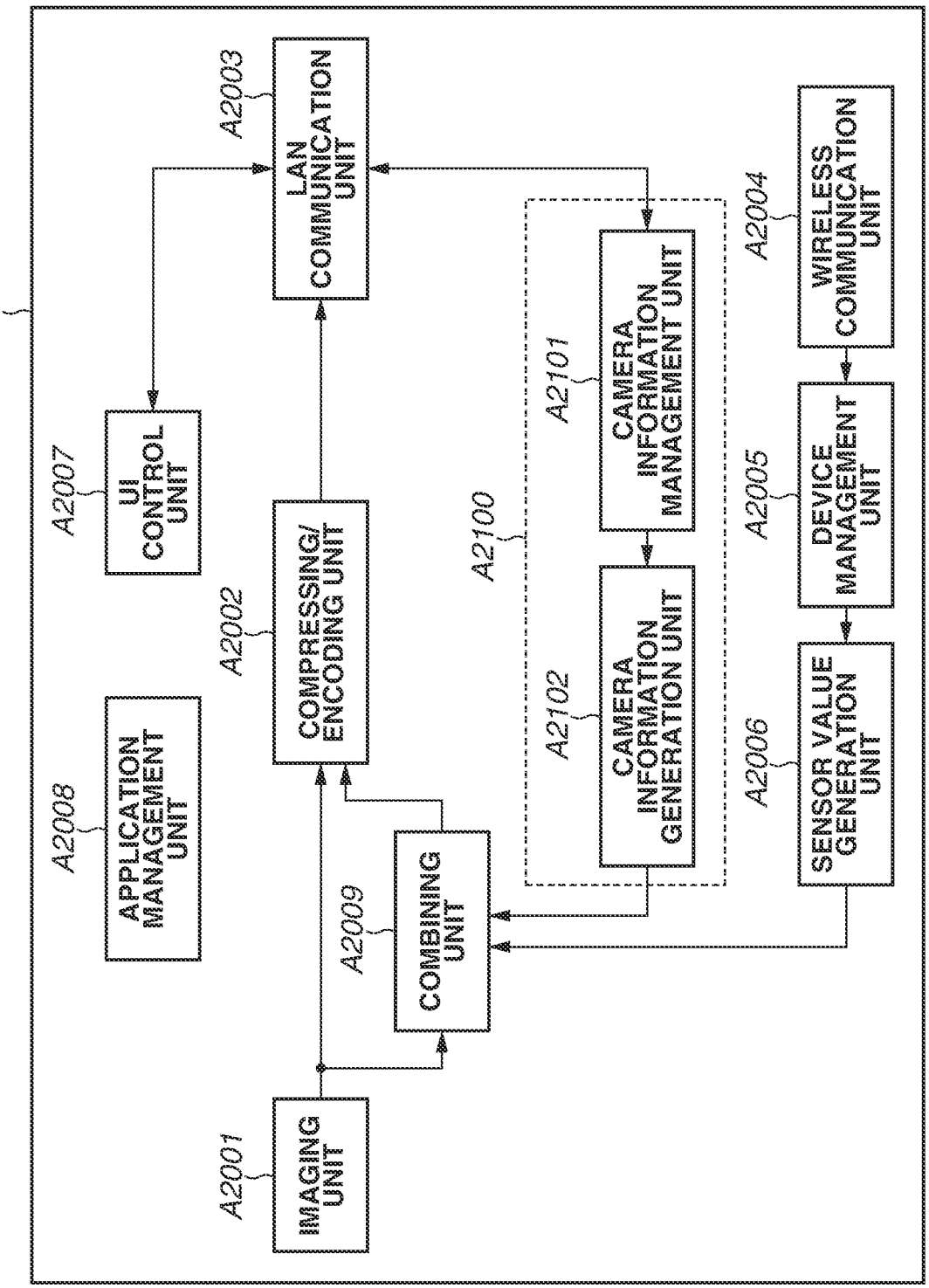
FIG. 6 is a block diagram illustrating a configuration example of a camera apparatus.

FIG. 6 is a block diagram illustrating an example of a functional configuration of the monitoring camera 101 according to the present exemplary embodiment. The monitoring camera 101 includes an imaging unit A2001, a compressing/encoding unit A2002, a LAN communication unit A2003, a wireless communication unit A2004, a device management unit A2005, a sensor value generation unit A2006, and a UI control unit A2007. Further, the monitoring camera 101 includes an application management unit A2008, a combining unit A2009, and an application unit A2100. The application unit A2100 is a camera application unit and includes a camera information management unit A2101 and a camera information generation unit A2102.

The monitoring camera 101 is a fish-eye lens camera to capture a wide range including the monitoring cameras 102 and 103. The imaging unit A2001 generates a video image captured using a fish-eye lens. The compressing/encoding unit A2002 is similar to the compressing/encoding unit A1002 illustrated in FIG. 3. The LAN communication unit A2003 is similar to the LAN communication unit A1003 illustrated in FIG. 3. The wireless communication unit A2004 is similar to the wireless communication unit A1004 illustrated in FIG. 3. The device management unit A2005 is similar to the device management unit A1005 illustrated in FIG. 3. The application management unit A2008 is similar to the application management unit A2008 illustrated in FIG. 3. The camera information management unit A2101 is similar to the camera information management unit A1101 illustrated in FIG. 3.

The sensor value generation unit A2006 generates a display instruction to display sensor information acquired by the device management unit A2005 in a superimposed manner on a screen, and transmits the generated display instruction to the combining unit A2009.

The UI control unit A2007 is a control unit for a web user interface to control display on the terminal device 400 and input from the terminal device 400.

The camera information generation unit A2102 generates a display instruction to display camera/sensor information acquired by the camera information management unit A2101 in a superimposed manner on a screen, and transmits the generated display instruction to the combining unit A2009.

The combining unit A2009 interprets the display instruction received from the sensor value generation unit A2006 and the camera information generation unit A2102, and converts character strings for display into a bitmap image. Then, the combining unit A2009 superimposes the bitmap image on a video image received from the imaging unit A2001 to generate an OSD image.

The compressing/encoding unit A2002 compresses and encodes the OSD image generated by the combining unit A2009, and transmits the resultant image to the terminal device 400 via the LAN communication unit A2003. The terminal device 400 decompresses and decodes the received OSD image to display an OSD image.

Figure 7A:
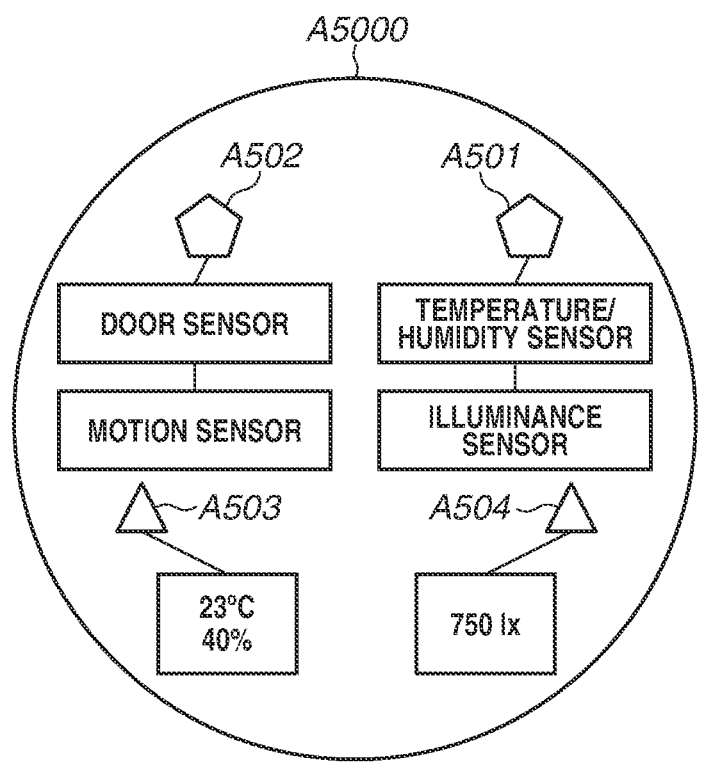
FIGS. 7A and 7B are diagrams each illustrating an example of display generated by superimposing device information on a video image.

FIG. 7A is a diagram illustrating an example of an OSD image A5000 generated by the combining unit A2009. The UI control unit A2007 displays the OSD image A5000 on the terminal device 400.

In the OSD image A5000, icons A501 to A504 and character strings are superimposed on a fish-eye video image captured by the imaging unit A2001. The imaging unit A2001 captures the fish-eye video image including the monitoring cameras 102 and 103.

The icons A501 and A502 indicate positions of the monitoring cameras 102 and 103, respectively. The icons A503 and A504 indicate positions of the sensors 201 and 202, respectively. Character strings indicating sensor information are coupled with the icons A501 and A502, and displayed in a superimposed manner on the video image. Further, character strings indicating sensor values are coupled with the icons A503 and A504, and displayed in a superimposed manner on the video image.

Figure 7B:
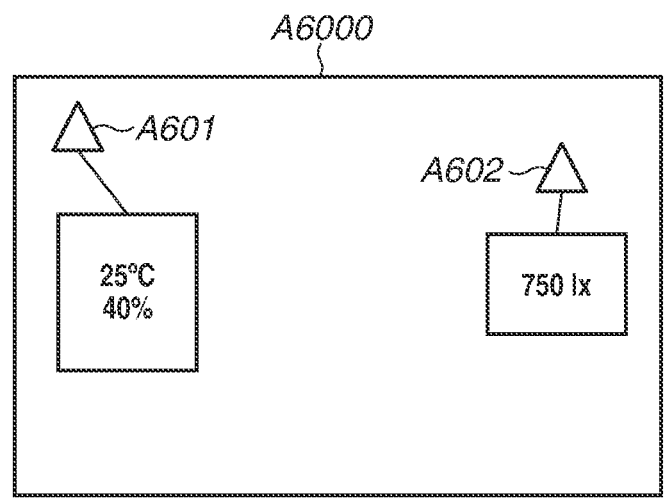

In a case where the user clicks and selects the icon A501 using the terminal device 400, the terminal device 400 is connected to the monitoring camera 102. As illustrated in FIG. 7B, the monitoring camera 102 displays, on the terminal device 400, an OSD image A6000 generated by superimposing the sensor values of the sensors 203 and 204 on the video image of the monitoring camera 102.

The OSD image A6000 is a video image generated by superimposing, on the video image of the monitoring camera 102, icons A601 and A602 and sensor values. The icons A601 and A602 are icons indicating the sensors 203 and 204, respectively, connected to the monitoring camera 102. The sensor values acquired from the sensor 203 and the sensor value acquired from the sensor 204 by the monitoring camera 102 are displayed in a manner coupled to the icons A601 and A602, respectively.

Similarly, in a case where the user clicks and selects the icon A502 on the terminal device 400, the terminal device 400 is connected to the monitoring camera 103. The monitoring camera 103 displays, on the terminal device 400, an OSD image generated by superimposing the sensor values of the sensors 205 and 206 on a video image of the monitoring camera 103.

As described above, according to the present exemplary embodiment, the monitoring cameras 101 to 103 can display, on the web browser of terminal device 400, the OSD images A5000 and A6000 each generated by superimposing the sensor values on the video image of corresponding one of the monitoring cameras 101, 102, and 103. Accordingly, the user can display a desired video image of any of the monitoring cameras 101 to 103 by using the terminal device 400, and check the video image and the sensor values displayed together.

Figure 9:
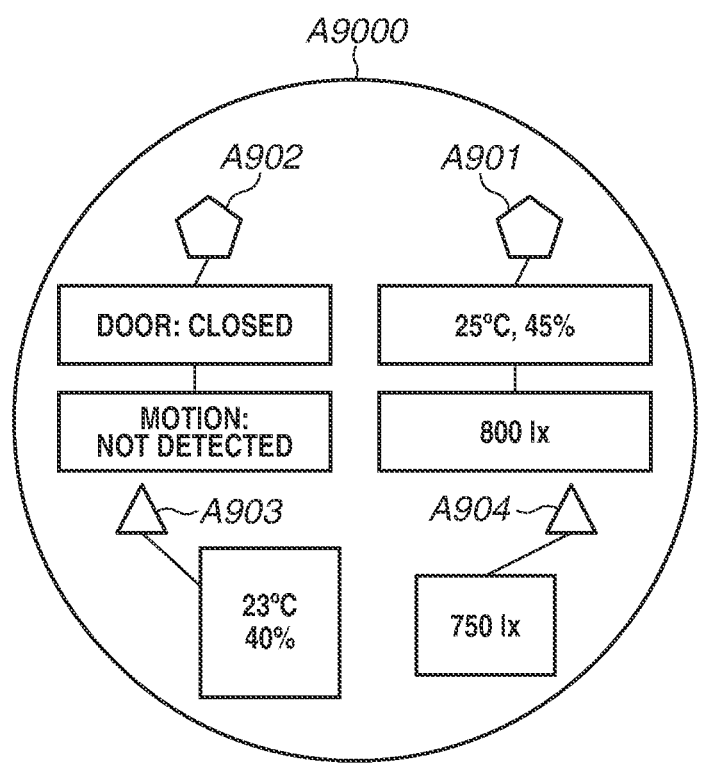
FIG. 9 is a diagram illustrating an example of display generated by superimposing sensor values of devices on a video image.

In the second exemplary embodiment, as illustrated in FIG. 7A, the monitoring camera 101 displays, on the terminal device 400, the OSD image A5000 generated by superimposing, on the video image captured by its own camera, the sensor information coupled to each of the icon A501 and A502 of the monitoring cameras 102 and 103. In a third exemplary embodiment, as illustrated in FIG. 9, the monitoring camera 101 displays, on the terminal device 400, an OSD image A9000 generated by superimposing, on a video image captured by its own camera, sensor values coupled to an icon A901 of the monitoring camera 102 and sensor values coupled to an icon A902 of the monitoring camera 103.

FIG. 8 is a block diagram illustrating an example of a functional configuration of the monitoring camera 101 according to the third exemplary embodiment. The monitoring camera 101 includes an imaging unit A3001, a compressing/encoding unit A3002, a LAN communication unit A3003, a wireless communication unit A3004, a device management unit A3005, a sensor value generation unit A3006, and a UI control unit A3007. Further, the monitoring camera 101 includes an application management unit A3008, a combining unit A3009, and an application unit A3100. The application unit A3100 is a camera application unit and includes a camera information management unit A3101 and a sensor value generation unit A3102.

The imaging unit A3001 is similar to the imaging unit A2001 illustrated in FIG. 6. The compressing/encoding unit A3002 is similar to the compressing/encoding unit A2002 illustrated in FIG. 6. The LAN communication unit A3003 is similar to the LAN communication unit A2003 illustrated in FIG. 6. The wireless communication unit A3004 is similar to the wireless communication unit A2004 illustrated in FIG. 6. The device management unit A3005 is similar to the device management unit A2005 illustrated in FIG. 6. The sensor value generation unit A3006 is similar to the sensor value generation unit A2006 illustrated in FIG. 6. The UI control unit A3007 is similar to the UI control unit A2007 illustrated in FIG. 6. The application management unit A3008 is similar to the application management unit A2008 illustrated in FIG. 6.

In addition to the function of the camera information management unit A1101 illustrated in FIG. 3, the camera information management unit A3101 periodically sends a sensor value acquisition command to the monitoring cameras 102 and 103 to acquire values of the sensors 203 and 204 connected to the monitoring camera 102 and values of the sensors 205 and 206 connected to the monitoring camera 103.

The sensor value generation unit A3102 generates a display instruction for displaying information related to the monitoring cameras 102 and 103 acquired by the camera information management unit A3101 and a video image generated by superimposing, on a video image received from the imaging unit A3001, values of the sensors 203 and 204 connected to the monitoring camera 102 and values of the sensors 205 and 206 connected to the monitoring camera 103. Then, the sensor value generation unit A3102 transmits the generated display instruction to the combining unit A3009.

The combining unit A3009 converts character strings representing the values of the sensors 201 to 206 into a bitmap image, in accordance with the display instruction received from the sensor value generation units A3006 and A3102. Then, the combining unit A3009 generates an OSD image generated by superimposing the bitmap image on the video image received from the imaging unit A2001.

FIG. 9 is a diagram illustrating an example of the OSD image A9000 generated by the combining unit A3009. The OSD image A9000 is a video image generated by superimposing the icons A901 to A904 and the character strings of the sensor values on the fish-eye image captured by the imaging unit A3001. The monitoring camera 101 displays the OSD image A9000 on the terminal device 400.

The icons A901 and A902 are icons indicating positions of the monitoring cameras 102 and 103, respectively. The icons A903 and 3904 are icons indicating the positions of the sensors 201 and 202, respectively.

Character strings coupled to the icon A901 and indicating the sensor values of the sensors 203 and 204 connected to the monitoring camera 102 are displayed. Character strings coupled to the icon A902 and indicating the sensor values of the sensors 205 and 206 connected to the monitoring camera 103 are displayed.

Character strings coupled to the icon A903 and indicating the sensor values of the sensor 201 connected to the monitoring camera 101 are displayed. A character string coupled to the icon A904 and indicating the sensor value of the sensor 202 connected to the monitoring camera 101 is displayed.

In a case where the user clicks and selects the icon A901 on the terminal device 400, the terminal device 400 performs processing similar to the processing performed in the second exemplary embodiment. More specifically, the terminal device 400 is connected to the monitoring camera 102. On the terminal device 400, the monitoring camera 102 displays the OSD image A6000, illustrated in FIG. 7B, generated by superimposing the sensor values of the sensors 203 and 204 on a video image captured by the monitoring camera 102.

Similarly, in a case where the user clicks and selects the icon A902 on the terminal device 400, the terminal device 400 is connected to the monitoring camera 103. On the terminal device 400, the monitoring camera 103 displays an OSD image generated by superimposing the sensor values of the sensors 205 and 206 on a video image captured by the monitoring camera 103.

As described above, according to the present exemplary embodiment, the monitoring camera 101 displays, on the web browser of the terminal device 400, the OSD image A9000 generated by superimposing the sensor values of the sensors 201 to 206 on the video image captured by the monitoring camera 101. On the terminal device 400, the user can display and check the sensor values of the sensors 201 to 206 together with the video image captured by the monitoring camera 101.

In the first to the third exemplary embodiments, the descriptions have been provided of the cases in which the camera application is installed in the monitoring camera 101 supporting the Z-Wave function. However, the camera application may be installed in the monitoring camera 101 not supporting the Z-Wave function. In this case, the monitoring camera 101 displays information of the other cameras (monitoring cameras 102 and 103) without displaying the sensor values of the sensors 201 and 202 connected to the own camera (monitoring camera 101) and the link to the OSD screen of the own camera (monitoring camera 101). In other words, the monitoring camera 101 displays, on the terminal device 400, the sensor information or the sensor values of the sensors 203 and 204 connected to the monitoring camera 102 and the sensor information or the sensor values of the sensors 205 and 206 connected to the monitoring camera 103. Each of the sensors 201 to 206 may be connected to corresponding one of the monitoring cameras 101, 102, and 103 using the attachable/detachable wired connection, not limited to the wireless connection.

In step S104, the camera information management unit A1101 functions as a search unit to search for the other cameras (monitoring cameras 102 and 103) connected to the monitoring camera 101 via the IP network 300. For example, the camera information management unit A1101 searches for the monitoring cameras 102 and 103 by sending a broadcast packet or a multicast packet to the IP network 300.

In step S108, the UI control unit A1007 functions as a display unit to display, on the terminal device 400, the camera/sensor information 402 and the link buttons 404 each for linking to corresponding one of the monitoring cameras 102 and 103. The camera/sensor information 402 includes information related to devices connected to the other cameras found by the search (monitoring camera 102 or 103). These devices are, for example, the sensors 203 to 206. The link buttons 404 are instruction areas each for issuing an instruction to display a video image generated by superimposing the information related to the devices connected to corresponding one of the monitoring cameras 102 and 103 on the video image captured by the corresponding one of the monitoring cameras 102 and 103. More specifically, the link buttons 404 are links each for causing the terminal device 400 to jump to the URL of corresponding one of the monitoring cameras 102 and 103.

In step S103, the UI control unit A1007 displays, on the terminal device 400, the sensor value 401 and the link button 403 for linking to the monitoring camera 101. The sensor value 401 includes information related to the devices connected to the monitoring camera 101. These devices are, for example, the sensors 201 and 202. The link button 403 is an instruction area for issuing an instruction to display a video image generated by superimposing, on the video image captured by the monitoring camera 101, the information related to the devices connected to the monitoring camera 101.

The imaging unit A2001 captures a video image. The UT control unit A2007 displays, on the terminal device 400, the OSD image A5000 illustrated in FIG. 7A. The OSD image A5000 is a video image generated by superimposing, on the video image captured by the imaging unit A2001, the information related to the devices each connected to corresponding one of the monitoring cameras 102 and 103, the icons A501 and A502, and the like. Each of the icons A501 and A502 is an instruction area for issuing an instruction to display a video image generated by superimposing, on the video image captured by corresponding one of the monitoring cameras 102 and 103, the information related to the devices connected to the corresponding one of the monitoring cameras 102 and 103. The icons A501 and A502 are displayed at positions corresponding to positions of the monitoring cameras 102 and 103, respectively, on the video image captured by the imaging unit A2001.

The OSD image A5000 is a video image generated by superimposing, on the video image captured by the imaging unit A2001, information related to the devices connected to the monitoring camera 101, information related to the devices connected to the monitoring cameras 102 and 103, and icons A501 and A502. The UI control unit A2007 displays, as the OSD image A5000, position areas each indicating corresponding one of positions of the sensors 201 and 202 connected to the monitoring camera 101 on the video image captured by the imaging unit A2001, as the icons A503 and A504, respectively, on the terminal device 400.

In FIG. 7A, the UI control unit A2007 displays, on the terminal device 400, types of the sensors 203 and 204 coupled to the icon A501 and types of the sensors 205 and 206 coupled to the icon A502, as the OSD image A5000. In FIG. 9, the UI control unit A3007 displays, on the terminal device 400, the sensor values of the sensors 203 and 204 coupled to the icon A901 and the sensor values of the sensors 205 and 206 connected to the icon A902, as the OSD image A9000.

The user can easily connect the terminal device 400 to the monitoring camera 101 to which the sensors 201 and 202 are connected, the monitoring camera 102 to which the sensors 203 and 204 are connected, or the monitoring camera 103 to which the sensors 205 and 206 are connected, to observe the sensor values of the sensors 201 to 206 on a video image without an external server, such as a VMS, by using a web browser of the terminal device 400. The user can easily acquire a video image generated by superimposing the sensor values of the other cameras (the sensor values of the sensors 203 and 204 connected to the monitoring camera 102 and the sensor values of the sensors 205 and 206 connected to the monitoring camera 103) by connecting to one camera (monitoring camera 101), and following the links, by using the terminal device 400.

The present disclosure can also be realized by processing of supplying a program for implementing one or more functions of the above-described exemplary embodiments to a system or an apparatus via a network or a storage medium, and one or more processors in the system or the apparatus reading and executing the program. Further, the present disclosure can also be realized by a circuit (e.g., Application Specific Integrated Circuit (ASIC)) implementing one or more functions.

The above-described exemplary embodiments merely describe the specific examples to implement the present disclosure, and the technical scope of the present disclosure should not be construed in a limited way. Thus, the present disclosure can be implemented in various ways without departing from the technical thought or the main features.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No, 2021-072556, filed Apr. 22, 2021, which is hereby incorporated by reference herein in its entirety.

What is claimed is:

1. A camera apparatus comprising:
one or more processors; and
one or more memories including computer-readable instructions stored thereon that, when executed by the one or more processors, cause a computer to function as:
a search unit configured to search for another camera apparatus connected to the camera apparatus via a network;
a determining unit configured to determine whether the another camera apparatus has a predetermined function or not; and
a display unit configured to display, on a terminal device, information related to a device related to the predetermined function and connected to the another camera apparatus found by the search and an instruction area for issuing an instruction to display a video image that is generated by superimposing, on a video image captured by the another camera apparatus, the information related to the device connected to the another camera apparatus, in a case where the determining unit determines that the another camera apparatus has the predetermined function.

2. The camera apparatus according to claim 1, wherein the instruction area is a link for causing the terminal device to jump to a Uniform Resource Locator of the another camera apparatus.

3. The camera apparatus according to claim 1, wherein the display unit displays, on the terminal device, information related to a device related to the predetermined function and connected to the camera apparatus.

4. The camera apparatus according to claim 1, wherein the search unit searches for the another camera apparatus by sending a broadcast packet or a multicast packet to the network.

5. The camera apparatus according to claim 1, wherein the display unit displays, on the terminal device, an instruction area for issuing an instruction to display a video image that is generated by superimposing, on a video image captured by the camera apparatus, information related to a device related to the predetermined function and connected to the camera apparatus.

6. The camera apparatus according to claim 1, wherein the instructions cause the computer to further function as:
an imaging unit configured to capture a video image,
wherein the display unit displays, on the terminal device, a video image that is generated by superimposing, on the video image captured by the imaging unit, the information related to the device connected to the another camera apparatus and the instruction area.

7. The camera apparatus according to claim 6, wherein the instruction area is displayed at a position corresponding to a position of the another camera apparatus on the video image captured by the imaging unit.

8. The camera apparatus according to claim 6,
wherein the device is a sensor, and
wherein the information related to the device is a type of the sensor.

9. The camera apparatus according to claim 6,
wherein the device is a sensor, and
wherein the information related to the device is a sensor value.

10. The camera apparatus according to claim 6, wherein the display unit displays, on the terminal device, a video image that is generated by superimposing, on the video image captured by the imaging unit, information related to a device related to the predetermined function and connected to the camera apparatus, the information related to the device connected to the another camera apparatus, and the instruction area.

11. The camera apparatus according to claim 10, wherein the display unit displays, on the terminal device, a position area indicating a position of the device related to the predetermined function and connected to the camera apparatus on the video image captured by the imaging unit.

12. A control method for a camera apparatus comprising:
searching for another camera apparatus connected to the camera apparatus via a network;
determining whether the another camera apparatus has a predetermined function or not, and
displaying, on a terminal device, information related to a device related to the predetermined function and connected to the another camera apparatus found by the search and an instruction area for issuing an instruction to display a video image that is generated by superimposing, on a video image captured by the another camera apparatus, the information related to the device connected to the another camera apparatus, in a case where in the determining that the another camera apparatus has the predetermined function.

13. A non-transitory computer-readable storage medium storing a program for causing a computer to execute a control method for a camera apparatus comprising:
searching for another camera apparatus connected to the camera apparatus via a network;
determining whether the another camera apparatus has a predetermined function or not; and
displaying, on a terminal device, information related to a device related to the predetermined function and connected to the another camera apparatus found by the search and an instruction area for issuing an instruction to display a video image that is generated by superimposing, on a video image captured by the another camera apparatus, the information related to the device connected to the another camera apparatus, in a case where in the determining that the another camera apparatus has the predetermined function.

* * * * *